(12) United States Patent
Skinner

(10) Patent No.: US 6,463,696 B2
(45) Date of Patent: Oct. 15, 2002

(54) CONTAINER AND TAG ASSEMBLY

(75) Inventor: Richard B. Skinner, Fairhope, AL (US)

(73) Assignee: Nursery Supplies, Inc., Chambersburg, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/741,474

(22) Filed: Dec. 20, 2000

(65) Prior Publication Data
US 2001/0002519 A1 Jun. 7, 2001

Related U.S. Application Data

(63) Continuation of application No. 09/255,774, filed on Feb. 23, 1999, now Pat. No. 6,199,319.

(51) Int. Cl.$^7$ .............................. G09F 3/04; A01G 9/02
(52) U.S. Cl. ......................................................... 47/66.6
(58) Field of Search .............................. 47/66.6; 40/645

(56) References Cited

U.S. PATENT DOCUMENTS

| 227,658 A | 5/1880 | Schultz |
| 1,195,268 A | 8/1916 | Riefsnyder |
| 2,153,227 A | 4/1939 | Allstatter |
| 4,008,543 A | 2/1977 | Vilt |
| 4,027,410 A | 6/1977 | Wheeler ........................ 40/645 |
| 4,731,943 A | 3/1988 | Schlicter ........................ 40/10 |
| 4,972,616 A | 11/1990 | Doll ............................. 40/645 |
| 5,438,796 A | 8/1995 | Nathan ........................... 47/66 |
| 5,537,768 A | 7/1996 | Tesselaar et al. ............... 40/645 |
| 5,575,107 A | 11/1996 | Doerr .......................... 47/1.01 |
| 5,941,019 A | 8/1999 | Guarriello, Sr. et al. . 47/66.7 X |
| 6,199,319 B1 * | 3/2001 | Skinner ....................... 47/66.1 |

FOREIGN PATENT DOCUMENTS

| DE | 29610433 U1 * | 9/1996 |
| EP | 0390989 | 10/1990 |
| FR | 2656944 A1 * | 7/1991 |
| FR | 0502281 A1 * | 9/1992 |
| FR | 2673755 A1 * | 9/1992 |
| GB | 2257109 A * | 1/1993 |
| WO | 90/05352 | 5/1990 |
| WO | 93/17412 | 9/1993 |
| WO | WO 97/07491 * | 2/1997 |

* cited by examiner

Primary Examiner—Peter M. Poon
Assistant Examiner—Jeffrey L. Gellner
(74) Attorney, Agent, or Firm—Drinker Biddle & Reath LLP

(57) ABSTRACT

A tamper resistant container and tag assembly is defined. The container includes a slit which may be in a juncture between an outwardly extending shoulder and the side wall of the container. The tag includes a coupling member which is capable of insertion through the slit, but resists withdrawal from the slit once engaged. When the slit is located in the juncture, a group of assemblies can be readily stacked with one another because the tag hangs flush against the side wall of the container without any bending of the tag, thereby offering nominal resistance to stacking. The slit is substantially closed when not being manipulated by a user, thereby preventing egress of dirt and moisture.

14 Claims, 8 Drawing Sheets

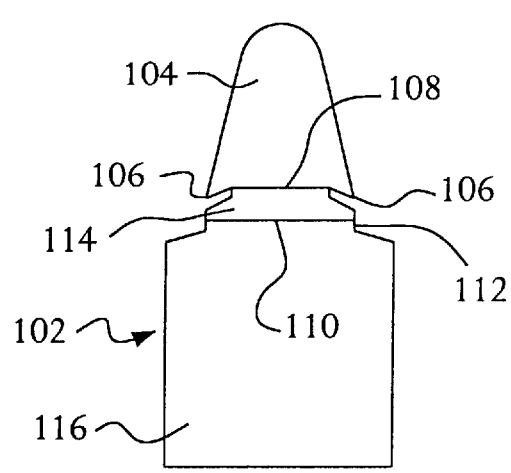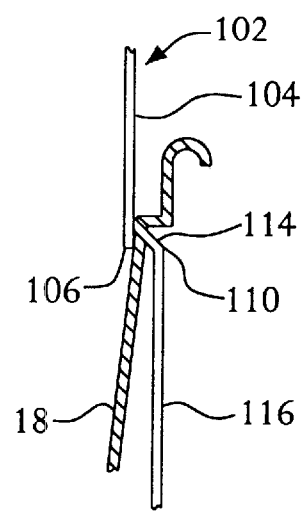
FIG. 18  FIG. 19
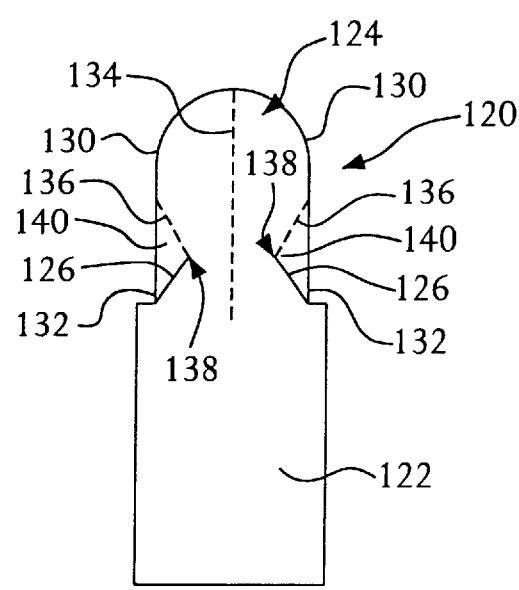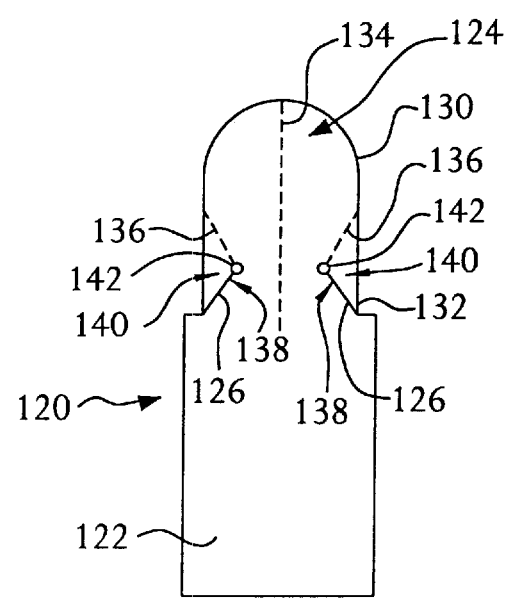
FIG. 20  FIG. 21

CONTAINER AND TAG ASSEMBLY

This application is a continuation of Ser. No. 09/255,774 filed on Feb. 23, 1999 now U.S. Pat. No. 6,199,319.

FIELD OF THE INVENTION

The present invention is directed to a container and a tag assembly. More particularly, the invention is directed to a nursery container and a tamper resistant tag that is attached to the container in a manner so that the tag is visible without obstruction from a live plant growing in the container.

BACKGROUND OF THE INVENTION

Plants and seedlings are usually grown in a suitable nursery container or pot for sufficient time for the plant to reach the desired size for marketing. The plants are then transported in the original container to a retail outlet for sale to the ultimate consumer. Plants that are sold through retail outlets and stores usually require suitable labels or tags to enable the purchaser to identify the plant variety as well as the price of the plant. The typical method of providing some form of identification of the plant is a stake or tag inserted into the soil. The stake generally includes a brief description of the plant as well as planting and care instructions and a price or price code. Examples of stakes for inserting in the soil are disclosed in U.S. Pat. No. 5,537,768 to Tesselaar et al., U.S. Pat. No. 5,575,107 to Doerr, U.S. Pat. No. 4,731,943 to Schlicter and U.S. Pat. No. 227,658 to Schultz. The use of stakes which are inserted into the soil have the disadvantage of being easily separated from the plant and container during shipping and handling. This prevents the consumer from identifying the plant and cost of the plant.

Another disadvantage of the use of stakes for identifying plants is the high occurrence of purchasers intentionally replacing the stake or other tag with the stake or tag from another plant of lower cost.

Various efforts have been proposed to overcome the disadvantages of the use of the stakes inserted into the soil to identify the plants. For example, tags can be attached to the plant or the nursery container by a suitable fastener such as staples, rings and bands. The tags attached by these fasteners are usually difficult and more time consuming to attach than stakes inserted into the soil, thereby increasing labor costs. In addition, the tags are often more expensive to produce and can result in damage to the plant when attached or when the tag is removed. Another form of device for identifying the plant within a container includes the use of labels applied with an adhesive. An example of such containers is disclosed in U.S. Pat. No. 5,438,796 to Nathan. These containers have the disadvantage of being labor intensive to apply the labels. In addition, the adhesive labels are not always waterproof or weatherproof, require a clean surface to adhere properly, and can be peeled from one container and applied to another. Injection molded containers have also been manufactured with a receptacle for attaching to a tag.

Accordingly, a continuing need exists for an improved nursery container and labeling device.

SUMMARY OF THE INVENTION

The present invention is directed to a container and tag assembly. More particularly, the invention is directed to a nursery container and a tamper resistant tag attached to the container.

Accordingly, a primary object of the invention is to provide a nursery container having a suitable structure to enable a tag member to be coupled to the container in a convenient and efficient manner.

Another object of the invention is to provide a nursery container having a structure for attaching a tag to the side wall of the container in a manner so that it is difficult for the consumer to remove the tag once the container is filled with soil.

A further object of the invention is to provide a nursery container having a hang tag attached to the container in a manner such that the tag is readily visible by the purchasing consumer and the retail clerk without interfering with the plant or the container.

Another object of the invention is to provide a nursery container having a tamper resistant tag attached to the container in a manner so that the tag does not interfere with the stacking and handling of the containers.

Still another object of the invention is to provide a nursery container and a hang tag where the tag is inserted upwardly through a slit in the container so that the tag can be suspended below the rim of the container.

A further object of the invention is to provide a nursery container and tag assembly where the tag cannot be readily removed from the container without damaging the container or the tag.

Another object of the invention is to provide a container and tag assembly where the tag includes a locking projection for coupling with the container while allowing the tag to hang downwardly. A further object of the invention is to provide a nursery container and hang tag assembly which is convenient to use, easy to assemble and inexpensive to manufacture.

Another object of the invention is to provide a nursery container having a slit formed in the side wall of the container for receiving a tag having a locking structure such that the tag cannot be separated from the container without damaging the tag or the container.

The objects and advantages of the invention are basically attained by providing a tamper resistant tag and container assembly, where the container has a bottom wall, and at least one side wall coupled to the bottom wall which extends in a substantially upward direction with respect to the bottom wall. The side wall has an upper end and at least one slit formed in the side wall and is positioned between the bottom wall and the upper end. The tamper resistant tag includes a printing area for receiving printed indicia, a neck portion, and a coupling member for coupling the tag to the side wall of the container. The coupling member has a first end connected to the neck portion of the tag, and a second end which is inserted through the slit in the side wall of the container for resisting separation of the tag from the container. In embodiments of the invention, the coupling member has a width slightly greater than the width of the neck portion of the tag. The slit preferably has a length less than the width of the coupling member and at least as long as the width of the neck portion.

Other objects, advantages and salient features of the invention will become apparent from the following detailed description, which, taken in conjunction with the annexed drawings discloses preferred embodiments of the present invention.

BRIEF DESCRIPTION OF THE DRAWINGS

Referring to the drawings which form a part of this original disclosure:

FIG. 18 is a front view of the tag in another embodiment;

FIG. 19 is a side view in partial cross-section of the tag and container of FIG. 18;

FIG. 20 is a front view of the tag in another embodiment; and

FIG. 21 is a front view of the tag in an alternative embodiment.

DETAILED DESCRIPTION OF THE INVENTION

Figure 1:
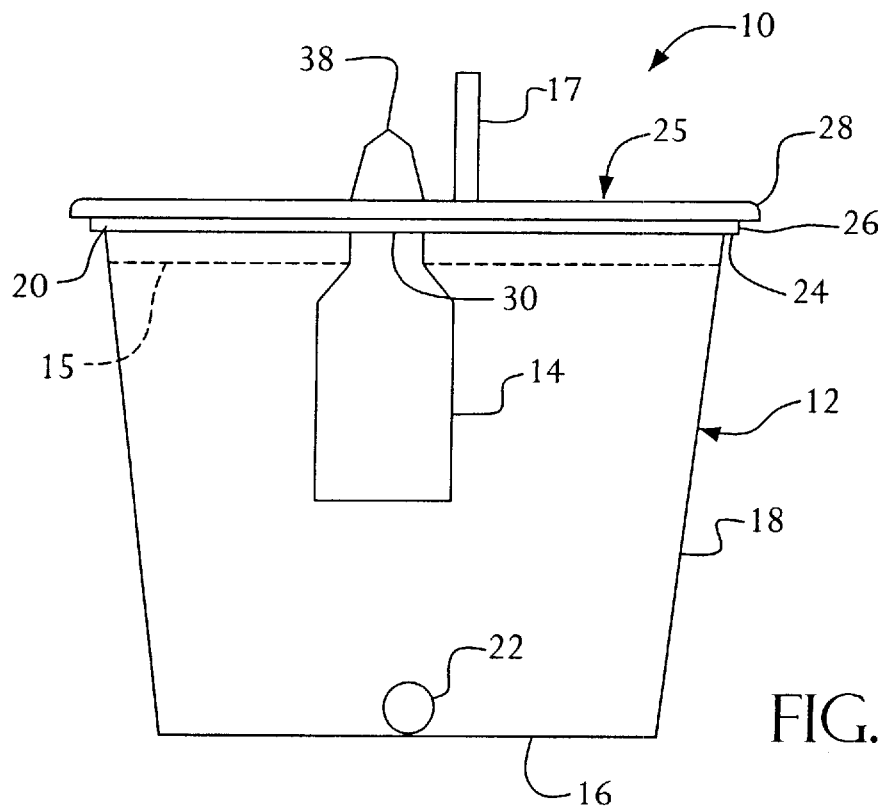
FIG. 1 is a side elevational view of the container and tag assembly in a first embodiment of the invention.

The present invention is directed to an assembly 10 which includes a container 12 and a tag 14. The invention is particularly directed to a container and tag assembly where the tag includes a tamper resistant coupling member for coupling the tag to the container in a convenient and efficient manner. The tag 14 is attached to the container 12 so that the tag is able to hang downward and adjacent the side of the container for ease of location and viewing of the tag. The tag is able to lie flat against the side of the container to allow multiple containers to be stacked by nesting.

In preferred embodiments of the invention, the container 12 is a nursery container as known in the art for supporting soil 15 and a plant 17 during growing, shipping and handling of the plant. The nursery container 12 includes a bottom wall 16 and a side wall 18. In embodiments, the side wall 18 has a substantially frustoconical shape which tapers inwardly toward the bottom wall 16 and is flared outwardly toward the upper end 20. The side wall 18 terminates at the upper end 20 to form an open top for receiving the soil and plant. Typically, at least one drain hole 22 is formed in the side wall 18 either adjacent or spaced from the bottom wall 16 to allow excess water to drain and prevent damage to the plant and root system.

The container 12 can be made from various materials using conventional manufacturing processes. Suitable containers are made from thermoplastic materials, such as high density polyethylene, by injection molding, blow molding, thermoforming or rotational molding. The containers can be made using virgin plastic resin, recycled plastics, and combinations thereof. In embodiments of the invention shown in FIG. 1, the side wall 18 includes an annular shoulder 24 which extends radially outwardly from the side wall 18 in a direction substantially parallel to the bottom wall 16. In the embodiment illustrated, the shoulder 24 is substantially flat and extends substantially perpendicular to a center axis of the container 12 so that the outer surface of the shoulder 24 faces downward. A cylindrical side portion 26 turns upward from the shoulder 24 in a generally axial direction with respect to the center axis of the container 12. The cylindrical side portion 26 extends around the perimeter of the open top end 25. In the embodiment illustrated, the cylindrical Bide portion 26 terminates in a curved rim or lip 28 which curves downwardly toward the bottom of the container 12 and defines an open top end 25. The lip 28 can have other shapes and dimensions as known in the art. For example, the lip can be a flat portion extending radially outward from the wall. The shoulder 24, cylindrical portion 26 and lip 28 form a strengthening member of the side wall 18 to retain the side wall 18 of the container 12 in the desired shape and resist collapsing or deformation of the side wall 18 when the container 12 is stacked or lifted.

In preferred embodiments, the side wall 18 has a frustoconical shape and the lip 28 is circular. In further embodiments, the side wall can be a flat surface forming a container having a square or rectangular cross section. The shoulder 24 preferably extends outwardly from the side wall 18 and is dimensioned to form a stacking shoulder when a plurality of the containers are nested together to prevent the containers from being wedged together. The shoulder 24 is generally positioned so that the shoulder 24 nests on top of the lip 28 of an adjacent container 12 when the containers are stacked in a nested arrangement.

Figure 4:
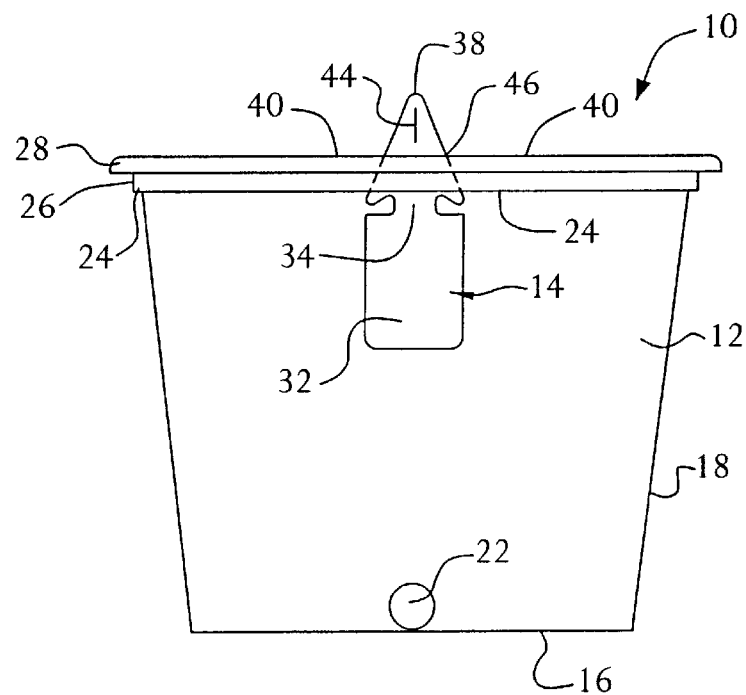
FIG. 4 is a side elevational view in partial cross-section showing the an container and tag member attached to the container.

The side wall 18 of container 12 includes a slit 30 for receiving the tag 14 in the illustrated embodiment. In a first embodiment, the slit 30 is formed in the side wall 18 adjacent the shoulder 24 as shown in FIG. 1. In the embodiment illustrated in FIG. 4, the slit 30 is formed at the juncture between the shoulder 24 and the side wall 18 and extends in a circumferential direction with respect to the center axis of the container 12. In further embodiments shown in FIG. 2, the slit 30 is formed in the side wall 18 and positioned so that the slit 30 is spaced between the upper end 20 of the side wall 18 and the bottom wall 16 and can be located to assist in inserting of the tag by suitable automated equipment. In the embodiment illustrated, the slit 30 is formed in the side wall 18 at about the midpoint. The slit 30 can be produced horizontally or vertically with respect to the bottom wall of the container.

Figure 3:
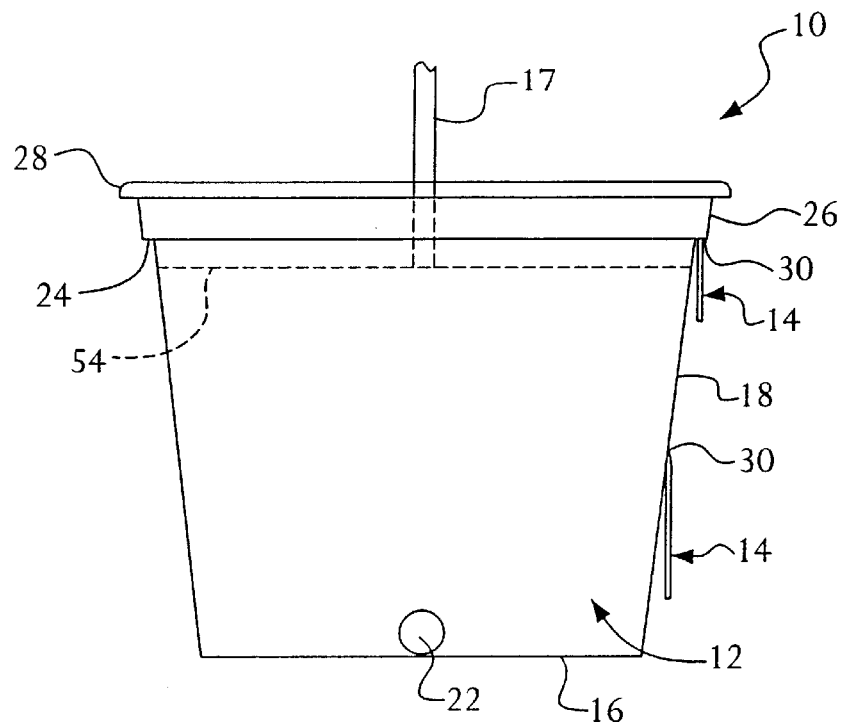
FIG. 3 is a side elevational view of the container and tag assembly in a further embodiment of the invention.

In still further embodiments shown in FIG. 3, a plurality of slits 30 can be produced in the container which can be formed in the side wall 18, cylindrical portion 26, or in the shoulder 24. In embodiments, the slit 30 is spaced a distance from the bottom wall 16 so that when the tag 14 is inserted into the slit, the tag can hang vertically without extending past the bottom wall. Typically, the slit 30 is spaced from the bottom wall 16 a distance at least equal to the combined length of the printing area 32 and the neck portion 34. In a further embodiment illustrated in FIG. 4A, the slit is spaced below the horizontal shoulder and lip.

The slit 30 can be molded in the side wall 18 or shoulder 24 during manufacture of the container when the container is made by injection molding. Alternatively, the slit 30 can be cut after manufacture using a suitable cutting tool regardless of the manufacturing process. In preferred embodiments, the slit is formed by cutting or piercing with a suitable tool since this produces a narrow slit with a minimum opening and remains substantially closed until pushed open by the user to insert the tag. The narrow slit then closes around the tag to engage the tag and resist separation. The cut slit further remains substantially closed to reduce loss of water when the plant is irrigated. Alternatively, the slit can be formed by punching with a suitable cutting tool and die.

The slit is generally formed in a horizontal direction with respect to the center axis of the container.

Alternatively, the slit can be formed vertically. The slit can also be formed as an open slot having a small gap, although this is generally less preferred. In a further embodiment illustrated in FIG. 4B, a slit 31 can be pierced or punched with small holes 33 at each end of the slit to resist propagation at the slit. The holes 33 can be pierced to stretch the plastic material and orient the polymer molecules around the hole. The oriented polymer molecules increase the strength and tear resistance of the plastic.

Figure 5:
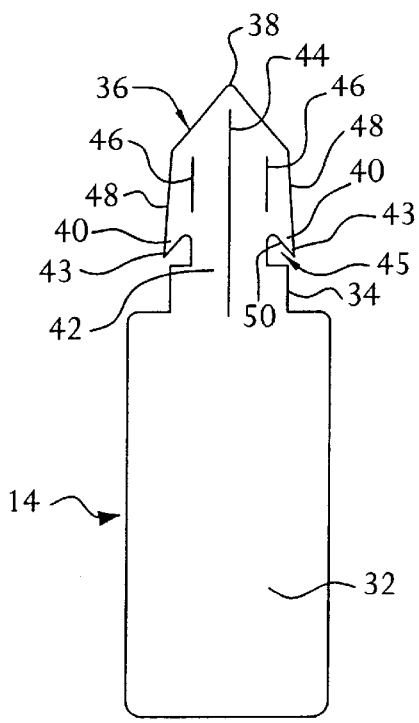
FIG. 5 is a front side view of the tag in a first embodiment of the invention.
Figure 5A:
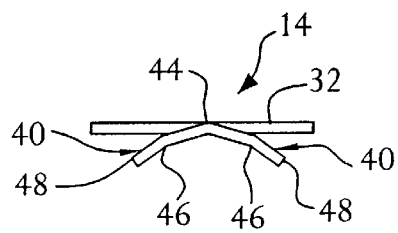
FIG. 5A is a top end view of the tag of FIG. 5.

Referring to FIGS. 5 and 5A, the tag 14 includes a flat planar body portion defining a printing area 32 for receiving printed information. The printing area 32 can include information relating to the identity of the plant, care instructions and price codes. In the embodiment illustrated, the printing area 32 has a substantially rectangular shape. In alternative embodiments, the printing area can be square, circular or other suitable shapes. The tag 14 can be made of any suitable material for labels. Preferably, the tag 14 is a plastic material that is sufficiently rigid to retain its shape while being flexible to bend and spring back to its original shape.

A neck portion 34 extends from one end of the printing area 32 and has a width less than the width of the printing area 32. In further embodiments, the neck portion 34 can be the same width or a greater width than the printing area 32. A coupling member 36 is attached to the neck portion 34 and extends outwardly in a generally longitudinal direction and in the same plane as the printing area 32.

As shown in FIG. 5, the coupling member 36 has a pointed or tapered end point 38 or can have a rounded edge for inserting through the slit 30 in the container 12. At least one and preferably two projecting hook shaped members 40 are formed adjacent to the neck portion 34 and extend toward the printing area 32. The projections 40 preferably are provided on each side of the coupling member 36 and define a neck portion 42 having a width less than the width between the ends 43 of the hook members 40 of the coupling member. Preferably, the portion 42 has a width less than the width of the neck portion 34 to form a recessed area 45. The hook members 40 form a locking member to lock into the slit 30 and resist separation of the tag 14 from the container 12.

Figure 6:
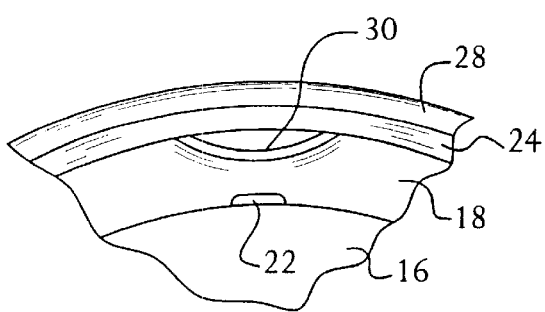
FIG. 6 is a partial top end view of the container of FIG. I showing the slit in the side wall of the container and a portion of the side wall adjacent the slit deflected inward.

In the embodiment of FIGS. 5 and 6, a fold line 44 extends in a longitudinal direction down the center of the neck portion 34 and coupling member 36 and terminates a short distance from the end point 38. Lateral fold lines 46 are provided in the coupling member 36 and 'extend in a generally longitudinal direction with respect to the center fold line 44 and are positioned between the center fold line 44 and the side edges 48 of the coupling member 36. The lateral fold lines 46 in the embodiment shown are aligned along the edge of the portion 42 and terminate a short distance from the longitudinal end of the coupling member 36. As shown in FIG. 5A, the coupling member 36 is folded along the center fold line 44 and along lateral fold lines 46 so that the coupling member 36 and the projecting members 40 are folded out of the plane of the printing area 32. The projecting members 40 are defined by the outer edges 48 and inner edges 50 to form the points 43. The fold lines 44 and 46 position the points 43 out of the plane of the printing area 32. In further embodiments, the tag is substantially flat with no fold lines. Alternatively, the tag can have a generally curved shape when viewed in cross-section.

Figure 4A:
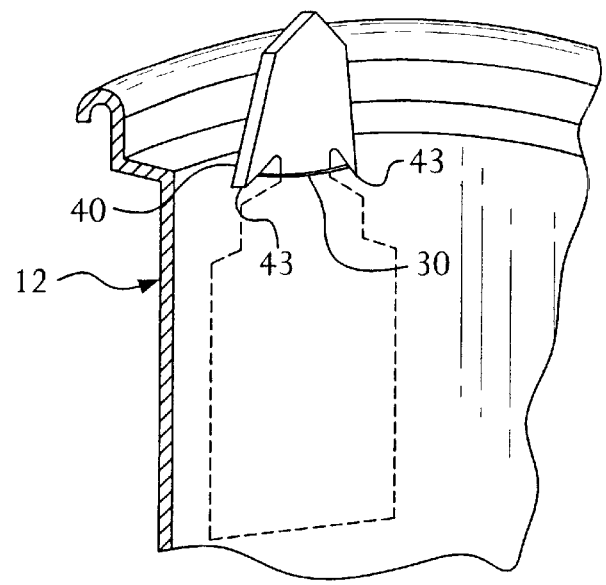
FIG. 4A is a side elevational view of a further embodiment of the invention.
Figure 4B:
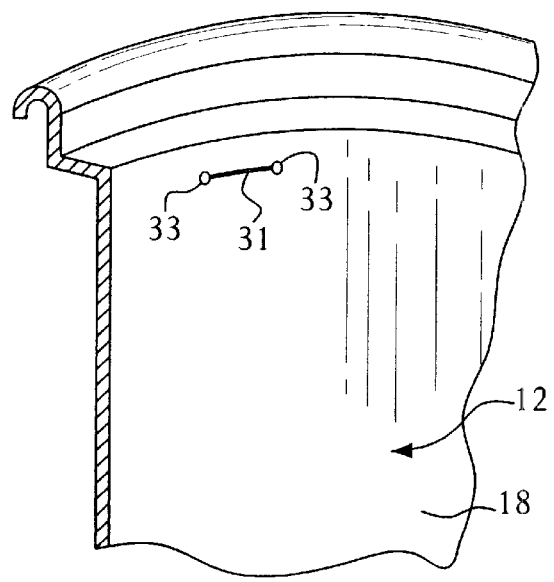
Figure 7:
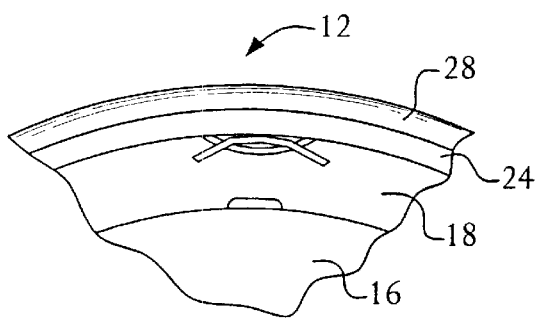
FIG. 7 is a partial top end view of the container of FIG. 1 showing the tag inserted through the slit in the side wall of the container.
Figure 8:
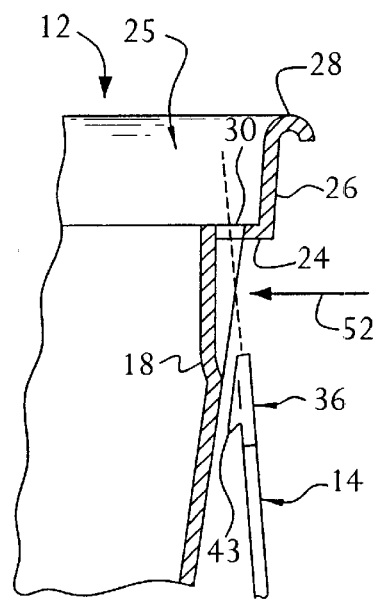
FIG. 8 is a partial side view in cross-section showing the slit in the side wall of the container and the tag being inserted through the slit.

In preferred embodiments of the invention, the slit 30 is formed in the side wall of the container 12 so that a portion of the side wall can be deflected inwardly by pressing in the direction of arrow 52 as shown in FIGS. 6, 7 and 8 to open the slit 30 for receiving the coupling member 36. The tapered end 38 of the coupling member 36 of the tag 14 is easily inserted through the open slit 30 as shown in FIG. 8. The resilience and memory of the plastic forming the side wall 18 of the container 12 springs back to its original position so that the projecting hooks 40 on the coupling member 36 are able to 'hook onto the side wall at the edges of the slit as shown in FIGS. 4A and 7.

In preferred embodiments of the invention, the tag 14 is inserted through the slit 30 in a generally upward direction until the projecting hooks 40 exit the slit and engage the edge of the slit 30. In this manner, the tag 14 is suspended in a generally downwardly direction toward the bottom wall 16 of the container 12. The printed area 32 of the tag 14 is readily visible from the side of the container 12 so that the tag 14 is not obscured by the plant 17 within the container. Generally, the slit 30 is positioned below the top end 20 of the container 12 a sufficient distance so that the tapered end 38 of the coupling member does not extend above the lip 28, although the coupling member can extend above the lip in other embodiments. In further embodiments, the slit 30 is formed in shoulder 20 as shown in FIG. 3 or in the lip 28 so that the slit faces in a generally downward direction for allowing the tag 14 to hang down. In other embodiments, the tag can be inserted from the top end of the container.

Figure 2:
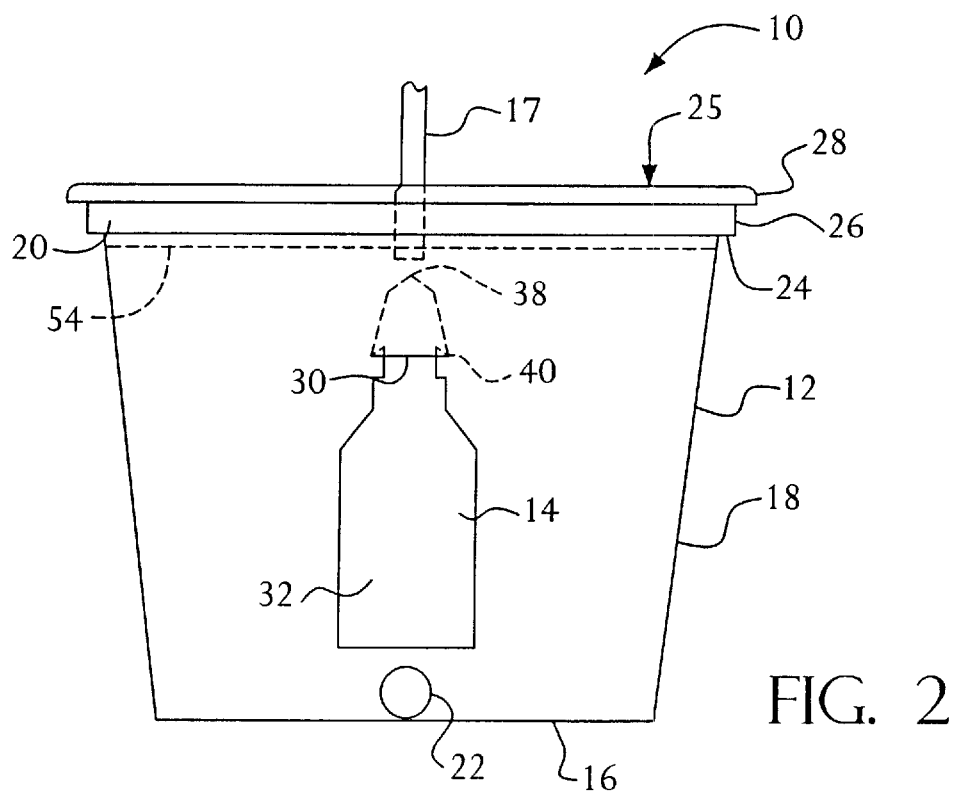
FIG. 2 is a side elevational view of the container and tag assembly in a second embodiment of the invention.

In the embodiment of FIG. 2, the container 12 is a nursery container with a slit 30 formed in the side wall 18 below a soil line 54. Generally the soil is sufficiently soft so that the side wall 18 can be deflected inwardly at the slit 30 a sufficient distance so that the tag 14 can be inserted through the slit 30. Preferably, the slit 30 is positioned a distance below the soil line 54 so that the coupling member 36 and particularly the projecting hooks 40 are positioned below the soil line 54 and covered by the soil. In this manner, the coupling member 36 of the tag 14 is positioned inside the container and covered by the soil and not readily accessible from the inside of the container to resist unauthorized removal of the tag 14 from the container 12. The projecting hooks 40 engage the side wall at the slit 50 to resist removal of the tag 14 from the container 12 without damaging the tag 14 or the container, thereby providing evidence of tampering with the tag 14.

The side wall 18 of the container 12 is generally curved as shown in FIGS. 6 and 7. The coupling member 36 is generally curved as shown in FIGS. 5 and 6. The coupling member 36 is inserted through the slit 30 so the concave face of the coupling member 36 is facing inwardly toward the center axis of the container. Inserting the tag 14 in this manner enables the projecting members 40 to spring inwardly toward the center axis to hook over the edge of the slit 30.

In embodiments, the slit 30 has a length at least as wide as and generally slightly greater than the width of the portion 42 between recesses 45 and less than the width between the projecting hook-like members 40. In further embodiments, the slit can have a width less than the width of portion 42. As the coupling member 36 is inserted through the slit 30, the coupling member 36 folds slightly along the center fold line 44 and the lateral fold lines 46 to pass easily through the slit 30. The projecting hook-like members 40 spring back to their original position after passing through the slit to engage the edge of the slit and resist removal of the tag 14 from the container 12. The tag 14 can be removed from the slit only with difficulty by folding the projecting members 40 into the same plane as the slit so that the projecting members can slide through the slit 30. By positioning the slit 30 below the soil line in the container 12, the projecting members 40 and the coupling member cannot be easily manipulated so that tag 14 is difficult to remove without damaging the tag 14.

In embodiments of the invention, the slit 30 is formed by cutting a slit so that the slit defines a minimal opening under normal conditions. A cut slit is advantageous since the resilience of the container readily closes the opening around the coupling member 36 to resist separation of the tag from the container and minimize leakage of water from the container. The cut slit can be difficult to visually locate when the tag is being inserted since the slit can close completely. To assist in locating the slits, a suitable indicator can be provided on the side wall or lip of the container. The indicator in the embodiment shown in FIG. 1 is the drain hole 22 which is positioned directly below the slit. In further embodiments, the indicator can be a mark or indicia on the side wall or lip adjacent or aligned with the slit.

Figure 9:
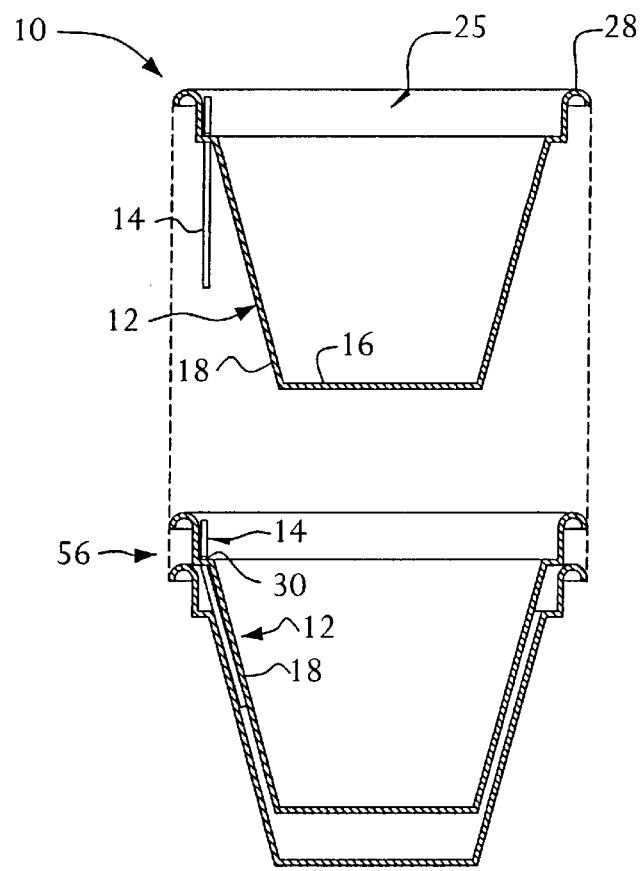
FIG. 9 is a cross-sectional side view of several containers arranged in a stack with the tags attached to the container.

In a further embodiment of the invention, a plurality of the container assemblies 10 can be stacked together to form a nested array 56 as shown in FIG. 9, prior to filling with soil. The tags 14 can be attached to the containers by inserting through the slit 30 as previously discussed so that the tags hang downwardly substantially parallel to the side wall. Since the slits are generally formed horizontally around the container, the printing area 34 and the coupling member 36 of the tags can lie flat against the side wall without significant bending of the tag. As shown in FIG. 9, the tags are generally self-orienting and able to fit between the side walls of the nested containers with minimal interference with the stacking and nesting of the containers. The individual containers can be separated from the stack without snagging by the tags. In this manner, the tags can be attached to the containers and shipped to the nursery where the containers are filled with soil and plants. Once filled with soil, the soil pushes the coupling member of the tag against the side wall of the container, thereby causing the printed portion of the tag to lie against the outer surface of the side wall.

Figures 10, 11:
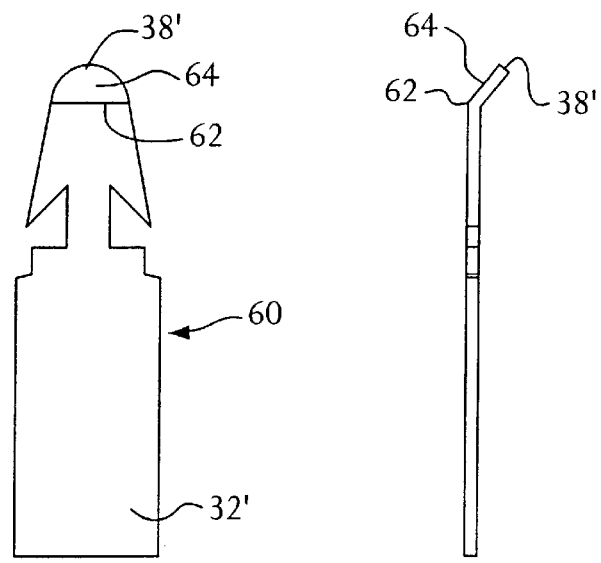
FIG. 10 is a front view of a tag in a further embodiment of the invention.
FIG. 11 is a side elevational view of the tag of FIG. 10.
Figure 12:
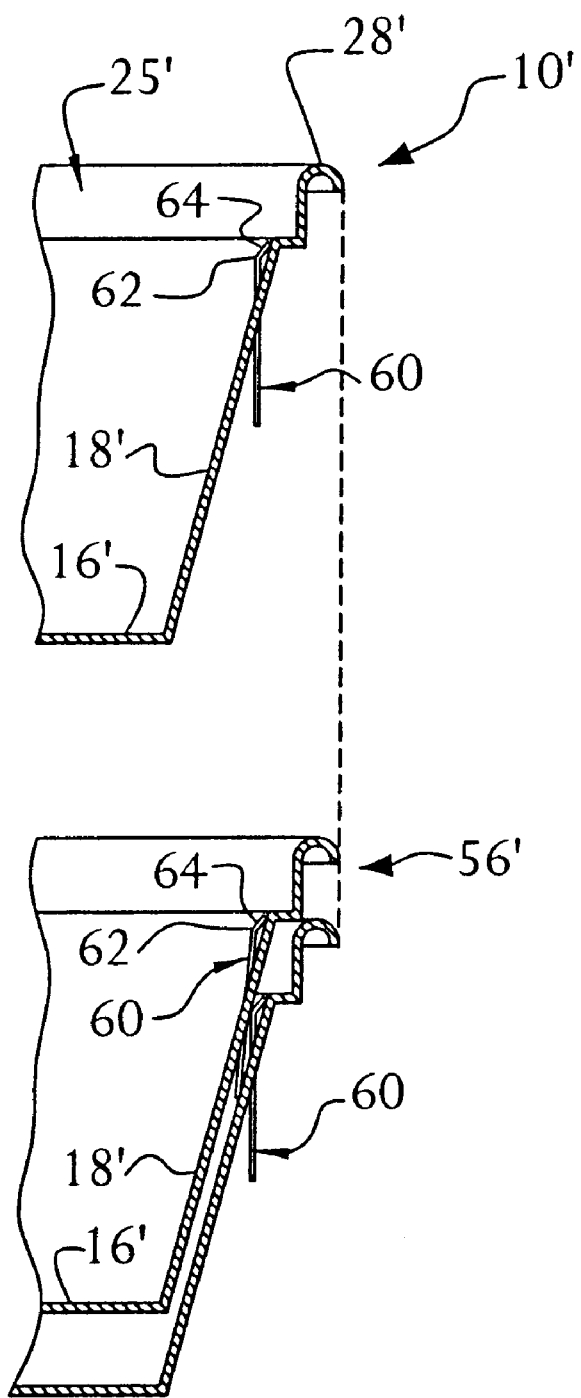
FIG. 12 is a side view in partial cross-section of an array of containers in a further embodiment of the invention.

In a further embodiment illustrated in FIGS. 10–12, a tag 60 is substantially the same as the tag 14 of FIG. 5 except for the coupling member having a single fold line 62 extending transversely. Identical elements are identified by the same reference number by the addition of a prime. As shown in FIG. 11, the tip 381 projects out of the plane of the printing area 321.

The tip 381 is generally folded along the fold line 62 at an angle of about 300 to about 900. In the embodiment illustrated, the tip 381 is folded at an angle of about 450. Preferably, the tip 38, is folded along the fold line 62 a sufficient amount so that the tip 381 contacts the inner surface of the side wall. The inclined portion 64 of the tip 381 to the fold line forms a slide surface when the containers are nested together as shown in FIG. 12. The inclined portion 64 of the tip 381 allows the tag to slide over the bottom corner of an adjacent container when the containers are stacked.

Figure 13:
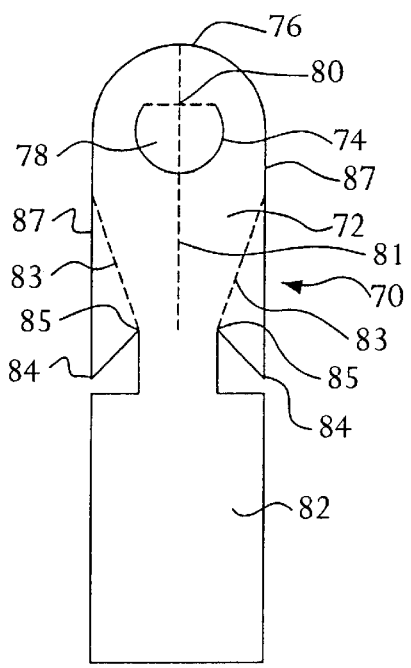
FIG. 13 is a front view of the tag in a further embodiment of the invention.
Figure 14:
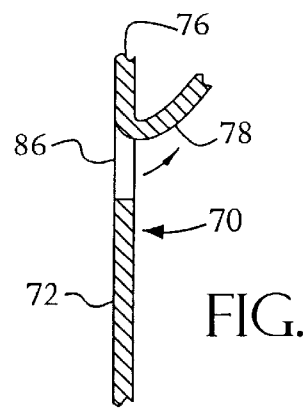
FIG. 14 is a partial cross-sectional view of the tag of FIG. 13.
Figure 15:
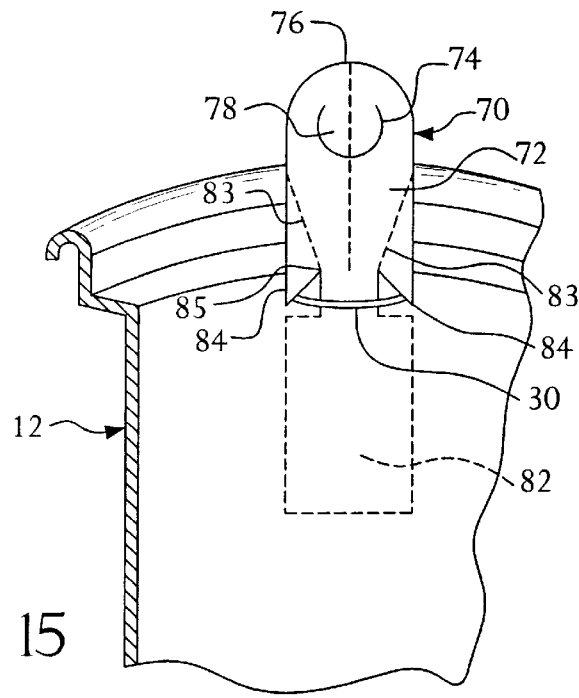
FIG. 15 is a Bide elevational view in partial cross-section showing the tag of FIG. 13 mounted in a container.

In a further embodiment of the invention shown in FIGS. 13–15, the tag 70 is similar to the tag 14 of FIG. 1 except that the coupling member 72 is longer and includes a curved cut portion 74. The cut portion can be square, rectangular, or other shapes. The coupling member 72 has a rounded end 76 and a pair of projecting members 84 for engaging the slot of the container. The cut portion 74 in the embodiment illustrated forms a flap 78 connected to the coupling member by a fold line 80. Preferably, the fold line 80 is formed at the end adjacent the rounded end 76. A center fold line 81 can extend along the center of the coupling member as shown. Fold lines 83 extend diagonally from the base 85 of the projecting members 84 to side edge 87 of the coupling member 72.

The coupling member 72 of tag 70 has a length so that when inserted through the slit 30 of the container as shown in FIG. 15, the cut portion 74 extends above the lip 28 of the container 12. The flap 78 is pushed through the coupling member and folded as shown in FIG. 14 to form a finger hole 86 for lifting the container by the tag 70. The body portion 82 of the tag 70 is larger than the dimension of the slit 30. The tag 70 is made of a sufficiently thick material to be strong enough to support the weight of the container and its contents. In the embodiment illustrated, the finger hole 86 is formed by folding the flap 78 along the fold line. In further embodiments, the cut portion can be a continuous cut to form a hole without a flap.

Figure 16:
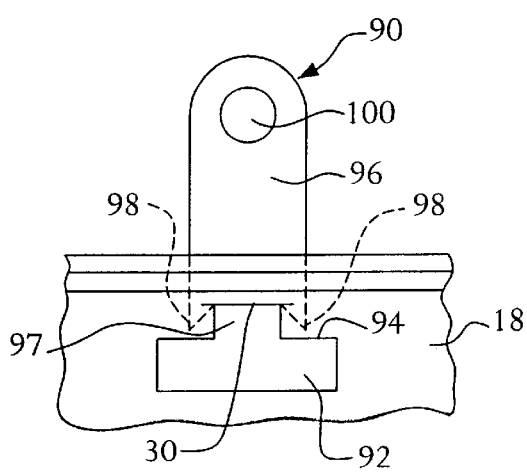
FIG. 16 is a front view of the tag and container in a further embodiment.
Figure 17:
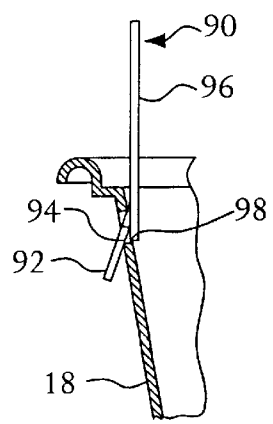
FIG. 17 is a partial side view in cross-section of the tag and container of FIG. 16.

FIGS. 16 and 17 show a further embodiment of the invention where the slit 30 is positioned in the side 18 below the rim and a tag 90 is inserted upwardly through the slit 30. The tag 90 has a rectangular portion 92 forming a wide shoulder 94 which is significantly wider than the length of the slit 30. The rectangular portion 92 can receive printed information as in the previous embodiments. A body portion 96 is attached to the shoulder 94 by a neck portion 97. A projecting leg member 98 is formed on each side of the body portion 94 and extends toward the rectangular portion 92. The body portion 94 has length to extend upward above the rim of the container to form a handle. In the embodiment shown, the body portion 94 includes a hole 100 for lifting the container by the tag 90.

FIGS. 18 and 19 show another embodiment of the invention where the tag 102 has a coupling member 104 with projecting members 106. The tag 102 includes a first transverse fold line 108 extending across the coupling member 104 at the base of the projecting members 106. A second fold line 110 extends transversely across the coupling member at the neck 112 of the tag. The tag 102 when inserted through a slot 30 in a container enables the coupling member 104 to fold about the fold line 108 and the main portion 112 of the tag to fold about the fold line 110. As shown in FIG. 19., the midsection 114 of the tag between the fold lines 108 and 110 extends through the slit 30and the coupling member and main portion 116 of the tag are able to be oriented substantially parallel to the side wall 18 of the container.

Referring to FIGS. 20 and 21, further embodiments of the tag are illustrated. The tag 120 of FIG. 20 has a main body portion 122 and a coupling member 124. The coupling member 124 is formed by slits 126 cut through the material extending diagonally toward the side edges 130 of the coupling member 124 to form projecting member 132 extending toward the body portion 122. A center fold line 134 extends longitudinally through coupling member 124. Diagonal fold lines 136 extend from the base 138 of the slits 128 to the outer side edges 130 to form triangular shaped tabs 140. The tabs 140 can be folded along fold lines 136 to bend the tabs 140 out of the plane of the coupling member 124 and body portion 122. In a similar embodiment shown in FIG. 21, holes 142 are punched or pierced at the base of the slits 126 to prevent propagation of the slits.

While various embodiments have been selected to illustrate the invention, it will be apparent to one of ordinary skill in the art that various modifications can be made to the container and tag assembly without departing from the spirit and scope of the invention as defined in the appended claims.

What is claimed is:

1. A tamper-resistant tag and container assembly comprising:
    a container having
        a bottom,
        at least one side wall connected to the bottom and extending substantially upward therefrom, the side wall having an upper end,
        a slit formed in the side wall of the container, the slit remaining substantially closed when free of manipulation, the slit capable of being at least partially opened by flexation of the side wall, and
        expanded openings formed in the container at two ends of the slit; and
    a tamper resistant tag having a coupling member, a neck, and a printing area, the coupling member formed so as to be capable of insertion through the slit of the container.

2. The tamper-resistant tag and container assembly of claim 1 wherein the coupling member of the tag has a transverse fold line which allows a tip of the coupling member to be folded toward the side wall of the container while the tag and container are assembled.

3. The tamper-resistant tag and container assembly of claim 1, further comprising:
    a shoulder disposed on the upper end of the side wall, the shoulder including a rim and a portion extending outwardly from the side wall;
    a juncture formed between the shoulder and the side wall, the juncture being the intersection of the outwardly extending shoulder portion and the upwardly extending side wall; and
    the slit being formed in the side wall at the juncture.

4. The tamper-resistant tag and container assembly of claim 3 wherein the coupling member of the tag has a transverse fold line which allows a tip of the coupling member to be folded toward the side wall of the container while the tag and container are assembled.

5. The tamper-resistant tag and container assembly of claim 3 wherein the coupling member of the tag further comprises a finger hole for carrying the assembly.

6. A tamper-resistant tag and container assembly comprising:
    a container having
        a bottom,
        at least one side wall connected to the bottom and extending substantially upward therefrom, the side wall having an upper end, and
        a slit formed in the side wall of the container, the slit remaining substantially closed when free of manipulation, the slit capable of being at least partially opened by flexation of the side wall; and
    a tamper resistant tag having a coupling member, a neck, and a printing area, the coupling member formed so as to be capable of insertion through the slit of the container and to have a finger hole for carrying the assembly.

7. A tag and container assembly comprising:
    a tamper resistant tag having a coupling member, a neck, and a printing area; and
    a container having
        a bottom,
        at least one side wall connected to the bottom and extending substantially upward therefrom, the side wall having an upper end,
        a shoulder disposed on the upper end, the shoulder including a rim and a portion extending substantially outward from the side wall,
        a juncture formed between the outwardly extending shoulder portion and the upwardly extending side wall, and
        a slit formed in the juncture such that engagement of the tag with the container, by insertion of the coupling member through the slit, allows the neck and printing area of the tag to rest flat against the side wall,
        wherein the slit remains substantially closed when free of manipulation, the slit capable of being at least partially opened by flexation of the side wall and shoulder.

8. The tag and container assembly of claim 7 wherein the coupling member of the tag has a transverse fold line which allows a tip of the coupling member to be folded toward the side wall of the container while the tag and container are assembled.

9. The tag and container assembly of claim 7 wherein the coupling member of the tag further comprises a finger hole for carrying the assembly.

10. The tag and container assembly of claim 7 wherein the slit has two ends, there being an opening disposed at either end of the slit, the openings remaining open when the slit is closed.

11. A tag and container assembly comprising:
    a tag having a print area, a neck and a coupling member;
    a container having a bottom, at least one side wall and a shoulder extending outwardly from the side wall, the intersection of the shoulder and side wall forming a junction, and a slit formed in the juncture, the slit being closed when free of manipulation, the slit being openable by flexing of the side wall and the shoulder;
    the coupling member of the tag being insertable through the slit to form the assembly;
    the print area of the tag hanging flush against the side wall of the container once the tag and container are engaged such that a plurality of tag and container assemblies can be stacked within one another without substantially bending the tag or encountering resistance therefrom.

12. The tag and container assembly of claim 11 wherein the slit has two ends, there being an opening disposed at either end of the slit, the openings remaining open when the slit is closed.

13. The tag and container assembly of claim 11 wherein the coupling member of the tag has a transverse fold line which allows a tip of the coupling member to be folded toward the side wall of the container while the tag and container are assembled.

14. The tag and container assembly of claim 11 wherein the coupling member of the tag further comprises a finger hole for carrying the assembly.

* * * * *